H. M. FARRAND.
FREIGHT CAR.
APPLICATION FILED JULY 20, 1917.
1,374,292.
Patented Apr. 12, 1921.
2 SHEETS—SHEET 1.
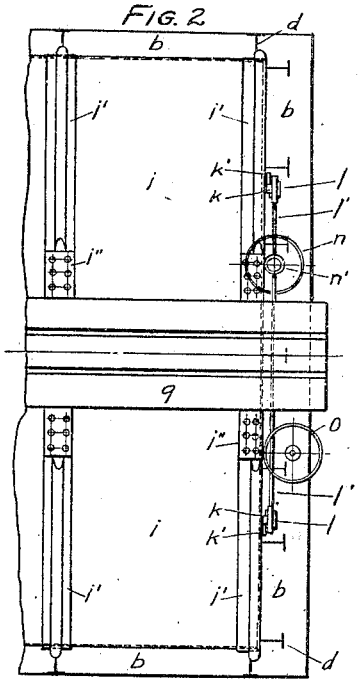
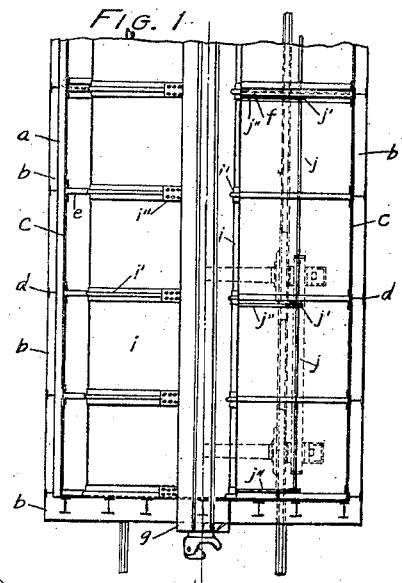
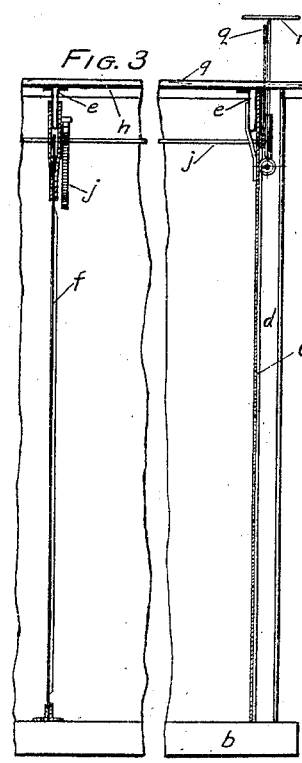
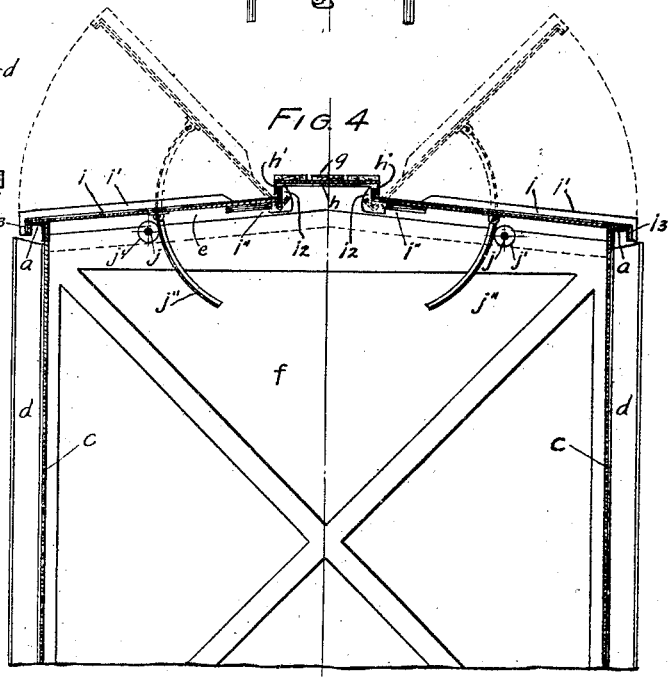
INVENTOR—
Harry M. Farrand,
BY
ATTORNEY.

H. M. FARRAND.
FREIGHT CAR.
APPLICATION FILED JULY 20, 1917.

1,374,292.

Patented Apr. 12, 1921.

INVENTOR-
Harry M. Farrand,
BY
ATTORNEY.

UNITED STATES PATENT OFFICE.

HARRY M. FARRAND, OF CLEVELAND, OHIO.

FREIGHT-CAR.

1,374,292.  Specification of Letters Patent.  Patented Apr. 12, 1921.

Application filed July 20, 1917. Serial No. 181,758.

*To all whom it may concern:*

Be it known that I, HARRY M. FARRAND, a citizen of the United States, residing at Cleveland, in the county of Cuyahoga and State of Ohio, have invented certain new and useful Improvements in Freight-Cars, of which the following is a specification.

My invention relates to improvements in freight cars, and has for its object the construction of such cars in a manner permitting the most rapid loading and unloading of bulk cargoes or car loads with the economies thereby attainable.

More specifically stated, my invention contemplates such changes and alterations in car construction as will adapt it for maximum loading of grain and the like, without trimming the load, and in the shortest space of time, and dumping the entire load from the top of the car by suitable unloading apparatus similar to that now used for unloading coal from gondolas.

In practising my invention, the entire roof of the car, with the exception of the narrow running-board, is hinged in two or more sections to open centrally and have the sides flush so that no detaining members will interfere with the dumping of the grain or other bulk load, when the car is tilted laterally. In furtherance of this I provide mechanism for operating the door-sections independently and locking them either open or closed, as desired. Moreover, the car is provided with bulkheads, and otherwise is suitably strengthened better to meet the unusual strains put upon it in dumping its load. Further details may be explained more readily by making reference to the accompanying drawings, wherein:—

Figure 1 is a top plan view of one bulkhead section of my improved car, with one roof member shown completely open.

Fig. 2 is a fragmentary plan view but with the doors or roof sections closed.

Fig. 3 is a fragmentary longitudinal section intermediately broken away.

Fig. 4 is a partial transverse section of the car showing a strengthening bulkhead and the means for opening, closing and locking the doors.

Throughout the several figures of the drawings, I have employed the same characters of reference to indicate similar parts.

Figure 5:
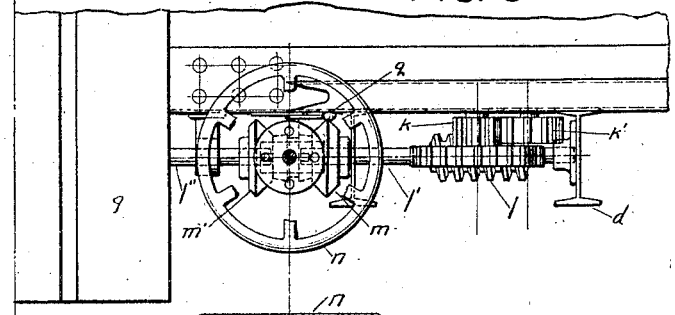
Fig. 5 is an enlarged fragmentary plan view of the means for actuating the doors or roof sections.
Figure 6:
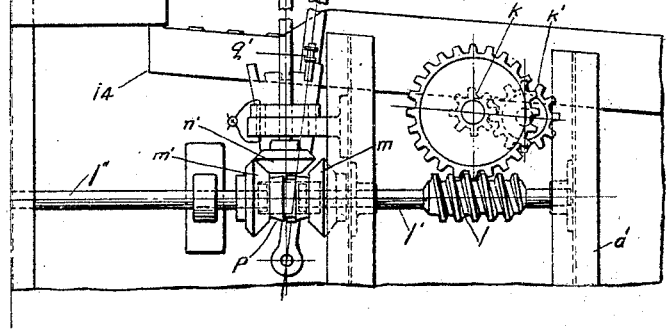
Fig. 6 is a view of the same apparatus in side elevation.
Figure 7:
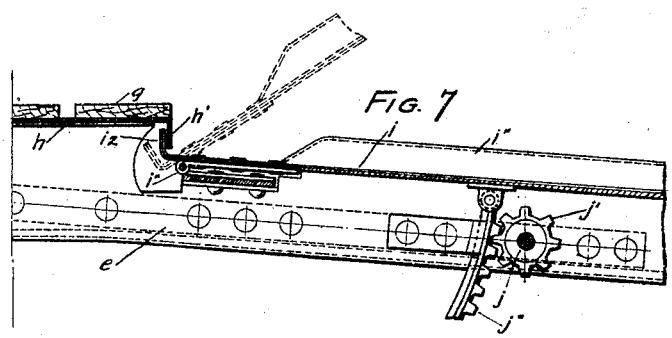
Fig. 7 is a fragmentary transverse section showing further details of the door construction and its operating mechanism.

Preferably my improved car has no doors or openings of any sort except at its top, and it is best given to all-metal construction as shown.

The car is provided with relatively heavy longitudinal top beams $a$, and bottom sills $b$, between which its sides $c$ are supported by spaced uprights or braces $d$. The heavy carlines $e$ spring across these uprights $d$ and tie the sides of the car rigidly together; the members $e$ and $e$ preferably having a U section as shown.

Two or more bulkheads $f$ separate the car longitudinally into three or more loading compartments. These bulkheads not only serve to maintain the load against shifting, but preferably are ribbed as shown and serve materially to stiffen and strengthen the car intermediate of its length. The planes of these bulkheads and the ends of the car preferably are the positions from which the car is supported in the unloading apparatus, during the lateral tilting of the car to unload its contents.

The running board $g$ is centrally positioned upon the elevated portions of the carlines, above the stationary mid-roof section $h$, which is provided with down turned longitudinal edges $h'$ along both its sides. The movable roof-sections $i$ are braced at intervals above the carlines by U-section braces or ribs $i'$, and are connected at the same intervals with the carlines by hinges $i''$, while inner elevated longitudinal rims $i^2$ respectively beneath the downturned edges $h'$, normally in close engagement therewith to form a weather-proof joint. Thus the hinge members are interiorly positioned upon the carlines where they are protected against rust and the accumulation of dirt, sleet and snow. Moreover, the abruptly upturned edges $i^2$, positioned slightly beyond said hinges, are not liable to become jammed or be frozen against opening the roof sections. In addition, the sides and ends of the roof-sections are down turned at $i^3$ and $i^4$ to fit snugly over the sides and ends respectively, of the upper framing of the car, and form therewith the necessary weather-proof joints. As a result, the overlapping or interlocking edges of the roof-sections serve materially to stiffen and strengthen the open top car of my invention. Thus, when the roof-sections are secured in their closed position, not only is the car made storm tight, but the sides and ends of the car body are stayed along their upper edges by the closely engaging down-turned edges of the roof-sections disposed in overlapping relation therewith.

These roof-sections or doors $i$ preferably are co-extensive with the length of the car, although this, of course, is optional. The preferred construction more readily lends itself to common operating means; one type of which I have shown and will briefly describe. This embodies simple manual means, although pneumatic or other power may as readily be availed of for actuating the roof-sections.

A shaft $j$ extends substantially the length of each roof-section, and pinions $j'$ are keyed thereon at intervals in position to mesh with the curved racks $j''$ pivoted beneath the ribs $i'$. At one end of the car is provided the reducing gear $k$, $k'$, the latter gear being mounted on shaft $j$ for rotating it, together with its pinions $j'$. A worm $l$ is in mesh with the larger gear $k$ and is adapted to rotate it in either direction. This worm is keyed on a stub-shaft $l'$ which has one of the meshing beveled gears $m$ splined adjacent to the end of said shaft. The other beveled gear $m'$ similarly is splined upon another and longer stub-shaft $l''$ extending to identical operating and locking mechanism for the roof-sections at the opposite side of the car. In consequence, this apparatus need not be specifically described nor shown.

A hand-wheel $n$, which should not be confused with the usual brake-wheel $o$, is provided above the double gears $m$, $m'$; its shaft terminating in the actuating beveled gear $n'$. Since these beveled gears merely are splined upon separate stub-shafts, they may alternatively be moved into engagement with the gear $n'$ for actuation in either direction required. A grooved sleeve $p$ rotatably unites the gears $m$, $m'$ which are placed under the control of a locking lever $q$, through the medium of a forked member $q'$ mounted upon said lever and taking into the grooved sleeve.

Thus, when the lever $q$ is moved to the right, as shown, the gear $m$ is brought into operative mesh with the bevel-gear $n'$ and through the medium of the worm reducing gear shaft $j$, its connected pinions $j'$ and racks $j''$, the left-hand roof-section may be readily elevated or lowered, as occasion requires. It will be recognized that with the construction shown, the doors or roof-sections are temporarily locked in any desired position.

Referring specifically to Fig. 1, the interior of one bulk-head section of my car is well shown, with the door or roof-section thrown fully open and the position of the car-trucks and rails indicated by dotted lines. Under these conditions, the car may be most expeditiously loaded either from one or from both sides simultaneously, and along its entire length, as from an expanded grain chute. The doors are closed when the car is fully loaded, by actuating the hand-wheel $n$ and its locking lever $q$, in the manner already indicated, first to actuate one set of worm and reducing gears, then through the other, in order to close the corresponding top doors or roof-sections.

When it is desired to empty the car it will be run upon the unloading apparatus and clamped firmly in place thereon. The hand-wheel or other power mechanism will then be operated to open an entire roof-section or sections on that side of the car from which it is to be unloaded. Thereupon, the car will be tilted in the usual manner and its contents immediately will be unloaded by gravity. As its top and sides afford no obstacle, rim or corner, barring the narrow carlines, to prevent the emptying of the grain or other bulk load, no sweeping, shoveling or other labor is entailed in the operation. Also, the damage commonly incurred in removing the usual grain-door is altogether done away with in my improved car.

It will be observed that the doors or roof-sections have the continuous up-turned inner edges $i^2$, which not only serve to form weather proof joints when the doors are closed, but prevent any moderate amounts of accumulated cinders, snow or rain from finding entrance to the car when the doors are thrown open.

Having now described the preferred embodiment of my invention, I claim as new and desire to secure by Letters Patent the following:—

1. In a top-opening car, the combination with the car-body open at the top, of roof-sections extending the length of the car and hinged adjacent to its median plane, shafting extending beneath said roof-sections, pinions disposed at intervals thereon, toothed links connected with the roof-sections and engaging said pinions, and means for rotating the shafting to actuate said roof-sections, substantially as set forth.

2. In a top-dumping car, the combination with a car-body affording substantially unobstructed sides, of roof-sections having down-turned edges hinged near the center of the car and extending beyond and interlocking with its sides, and selective individual elevating and locking mechanism respectively associated with the roof-sections upon either side of the car, adapted alternatively to raise, lower and lock said sections as required, substantially as set forth.

3. A freight car comprising a car-body open only at the top interior bracing means transversely positioned at definitely spaced intervals, roof-sections co-extensive with the length of the car and respectively hinged adjacent to its mid-width, and mechanism adapted to open and close said roof-sections, substantially as set forth.

4. A freight car comprising a car-body constructed with an opening only at its top, transverse spaced carlines, an interior bulkhead, doors or roof-sections hinged from the carlines at either side adjacent to the median line of the car and extending beyond its sides and means for actuating the latter, substantially as set forth.

5. In a top-opening car, the combination with the car-body, of roof-sections or doors centrally hinged at its top, actuating mechanism for opening and closing said doors, alternative connecting means, and worm and power mechanism associated therewith for normally locking and for opening and closing said doors, substantially as set forth.

6. In a car of the class described, the combination with a car-body constructed with substantially flush sides and ends, of intermediately positioned stiffening bulkheads, superposed carlines, roof-sections hinged thereto adjacent to the median line of the car, and mechanism for actuating and locking said roof-sections, substantially as set forth.

7. In a car of the class described, the combination with the car-body constructed with substantially flush sides and ends, of a plurality of hinged roof-sections normally covering said car-body and turning about axes adjacent to the median plane thereof, and intermediate power mechanism for individually actuating said roof-sections, comprising individual shafts, pinions thereon and co-acting toothed sectors, substantially as set forth.

8. In a car of the class described, the combination with the car-body constructed with substantially flush sides and ends, of a plurality of hinged roof-sections, turning about axes adjacent to the median plane of said car body, and intermediate actuating worm mechanism shafting, spaced pinions and associated toothed links connected with each section, substantially as set forth.

9. In a top-opening car, the combination with a car-body, of a hinged roof-section provided thereon, having an abruptly upturned member disposed along its inner or hinged edge adapted to check the entrance of foreign substances in any position of said roof-section, substantially as set forth.

10. In a freight car, the combination with a car-body open at the top, of roof-sections hinged interiorly to the car-lines, down turned members extending along the hinged edges and co-acting abruptly up-turned members on said sections and taking thereunder to form a weather proof inner joint, substantially as set forth.

11. In a freight car, the combination with a car-body open at the top, of roof-sections respectively hinged interiorly to median positions of the carlines, down-turned members extending along the hinged edges and co-acting abruptly up-turned members on said sections and taking beneath and behind said down-turned members; said roof-sections extending beyond the sides and ends of the car-body to form weather proof connection at all points, substantially as set forth.

12. In a top-dumping car, the combination with a car-body affording substantially unobstructed sides and ends, of roof-sections respectively hinged adjacent to the median plane of said car-body and extending beyond its sides and ends and interlocking therewith, and intermediate means for actuating said roof-sections and connected interiorly therewith at intervals to open the same, whereby free exit for the contents is afforded, substantially as set forth.

13. In a top-dumping car, the combination with a car-body affording substantially unobstructed sides, of transverse interior bracing means disposed at definite intervals and substantially co-extensive with the inner cross-section of the car to form supports when in tilted positions, roof-sections hinged adjacent to the mid-width of the car, and means for operating them from intermediate positions thereof, substantially as set forth.

14. In a top-opening car, the combination with the car-body open at the top, of roof-sections hinged adjacent to the median plane thereof, intermediate worm and screw mechanism respectively associated with each and selective power mechanism for operating either roof-section alternatively, substantially as set forth.

15. In a top-opening car, the combination with the car-body open at the top, of transverse carlines, and roof-sections interiorly hinged to said carlines, substantially as set forth.

16. In a top-opening car, the combination with the car-body open at the top, of roof-sections interiorly hinged adjacent to the median plane thereof and having down-turned edges in normal engagement with the sides and ends of said body, and interiorly acting means for operating said roof-sections, substantially as set forth.

17. In a top-opening car, the combination with the car-body, of an interiorly hinged roof-section therefor having a rectangularly up-turned member disposed along its hinged edge, and a rectangularly down-turned member exteriorly engaging the up-turned member to form a weather proof joint and, alternatively, a cinder trap, substantially as set forth.

In testimony whereof I do now affix my signature in the presence of two witnesses.

HARRY M. FARRAND. [L. S.]

Witnesses:
GEO. WYMAN,
ALBERT LYNN LAWRENCE.